(12) United States Patent
Takahashi et al.

(10) Patent No.: US 10,390,248 B2
(45) Date of Patent: Aug. 20, 2019

(54) USER EQUIPMENT, BASE STATION, AND METHOD FOR INDICATING INTER-FREQUENCY MEASUREMENT TO A USER EQUIPMENT FROM A BASE STATION

(71) Applicant: NTT DOCOMO, INC., Tokyo (JP)

(72) Inventors: Hideaki Takahashi, Tokyo (JP); Hiroshi Chin, Tokyo (JP); Kengo Yagyu, Tokyo (JP); Kunihiko Teshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 151 days.

(21) Appl. No.: 15/308,250

(22) PCT Filed: Apr. 21, 2015

(86) PCT No.: PCT/JP2015/062075
§ 371 (c)(1),
(2) Date: Nov. 1, 2016

(87) PCT Pub. No.: WO2015/170579
PCT Pub. Date: Nov. 12, 2015

(65) Prior Publication Data
US 2017/0064578 A1 Mar. 2, 2017

(30) Foreign Application Priority Data

May 9, 2014 (JP) .................................. 2014-097362
Sep. 29, 2014 (JP) .................................. 2014-199399

(51) Int. Cl.
*H04W 24/10* (2009.01)
*H04W 8/22* (2009.01)
*H04W 24/08* (2009.01)

(52) U.S. Cl.
CPC ............. *H04W 24/10* (2013.01); *H04W 8/22* (2013.01); *H04W 24/08* (2013.01)

(58) Field of Classification Search
None
See application file for complete search history.

(56) References Cited

U.S. PATENT DOCUMENTS

2011/0237202 A1  9/2011  Uemura et al.
2013/0215736 A1  8/2013  Han et al.
(Continued)

FOREIGN PATENT DOCUMENTS

EP    2624628 A1    8/2013
WO    2010032675 A1  3/2010

OTHER PUBLICATIONS

Extended European Search Report issued in the counterpart European Patent Application No. 15789951.9, dated Feb. 14, 2017 (11 pages).

(Continued)

*Primary Examiner* — Christine T Duong
(74) *Attorney, Agent, or Firm* — Osha Liang LLP

(57) ABSTRACT

An object of the present invention is to provide techniques for implementing inter-frequency measurement with flexible small gap measurement corresponding to capability of user equipment and/or to-be-measured cells. One aspect of the present invention relates to user equipment for transmitting and receiving radio signals to/from a base station, comprising: a capability information indication unit configured to indicate capability information of the user equipment to the base station; and an inter-frequency measurement unit configured to perform, upon receiving a small gap measurement applied inter-frequency measurement indication from the base station, a small gap measurement applied inter-frequency measurement in accordance with a small gap period for causing communication with the base station to be interrupted and an inter-frequency measurement period indicated in the inter-frequency measurement indication.

12 Claims, 14 Drawing Sheets

(56) References Cited

U.S. PATENT DOCUMENTS

| | | | | |
|---|---|---|---|---|
| 2013/0308481 A1* | 11/2013 | Kazmi | ................. | H04W 24/02 370/252 |
| 2014/0094162 A1* | 4/2014 | Heo | ........................ | H04W 4/70 455/422.1 |
| 2016/0192339 A1* | 6/2016 | Axmon | ................. | H04W 24/10 370/329 |

OTHER PUBLICATIONS

NTT DOCOMO, Inc.; "[Draft] LS on Small GAP measurement in Rel-12"; TSG-RAN Working Group 4 (Radio) meeting #72bis, R4-145959; Republic of Singapore, Singapore, Oct. 6-10, 2014 (2 pages).
International Search Report issued in corresponding application No. PCT/JP2015/062075 dated Jul. 7, 2015 (4 pages).
Written Opinion of the International Searching Authority issued in corresponding application No. PCT/JP2015/062075 dated Jul. 7, 2015 (5 pages).
NTT DOCOMO, "Proposal on small gaps"; 3GPP TSG-RAN WG4 Meeting #70bis, R4-141889; San Jose Del Cabo, Mexico; Mar. 31-Apr. 4, 2014 (4 pages).
3GPP TS 36.331 V12.1.0, "3rd Generation Partnership Project; Technical Specification Group Radio Access Network; Evolved Universal Terrestrial Radio Access (E-UTRA); Radio Resource Control (RRC); Protocol specification (Release 12)"; Mar. 2014 (356 pages).
NTT DOCOMO, Inc., "Small GAP measurement in Rel-12"; 3GPP TSG-RAN WG4 #72bis, R4-145958; Republic of Singapore, Singapore; Oct. 6-10, 2014 (9 pages).
NTT DOCOMO, "Discussion on interruptions in measurement without gaps"; 3GPP TSG-RAN WG4 Meeting #70, R4-140766; Prague, Czech Republic; Feb. 10-14, 2014 (3 pages).
3GPP TS 36.300 V12.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Mar. 2014 (209 pages).
3GPP TS 36.133 V12.3.0, "3rd Generation Partnership Project; Technical Specification Group Radio Access Network; Evolved Universal Terrestrial Radio Access (E-UTRA); Requirements for support of radio resource management (Release 12)"; Mar. 2014 (820 pages).
Office Action issued in corresponding Japanese Application No. 2016-517858, dated Oct. 10, 2017 (7 pages).
Office Action issued in the counterpart Japanese Patent Application No. 2016517858, dated Jun. 5, 2018 (6 pages).

* cited by examiner

UE-EUTRA-Capability information element

```
-- ASN1START
<<< skip unchanged part >>>
UE-EUTRA-Capability-v1130-IEs ::=   SEQUENCE {
    pdcp-Parameters-v1130               PDCP-Parameters-v1130,
    phyLayerParameters-v1130            PhyLayerParameters-v1130,
    rf-Parameters-v1130                 RF-Parameters-v1130,
    measParameters-v1130                MeasParameters-v1130,
    interRAT-ParametersCDMA2000-v1130   IRAT-ParametersCDMA2000-v1130,
    otherParameters-v11                 Other-Parameters-r11,
    fdd-Add-UE-EUTRA-Capabilities-v1130 UE-EUTRA-CapabilityAddXDD-Mode-v1130   OPTIONAL,
    tdd-Add-UE-EUTRA-Capabilities-v1130 UE-EUTRA-CapabilityAddXDD-Mode-v1130   OPTIONAL,
    nonCriticalExtension                UE-EUTRA-Capability-v1130-IEs          OPTIONAL
}

UE-EUTRA-Capability-v12xy-IEs ::=   SEQUENCE {
    rf-Parameters-v12xy                 RF-Parameters-v12xy,
    nonCriticalExtension                SEQUENCE {}                            OPTIONAL
}
<<< skip unchanged part >>>
RF-Parameters-v12xy ::=   SEQUENCE {
    supportedBandCombination-v12xy      SupportedBandCombination-v12xy
}
<<< skip unchanged part >>>
SupportedBandCombination-v12xy ::= SEQUENCE (SIZE (1..maxBandComb-r10)) OF
    BandCombinationParameters-v12xy
BandCombinationParameters-v12xy ::= SEQUENCE {
    bandParameterList-r12               SEQUENCE (SIZE (1..maxSimultaneousBands-r10)) OF
    BandParameters-v12xy                OPTIONAL,
    ...
}
<<< skip unchanged part >>>
BandParameters-v12xy ::= SEQUENCE {
    requiredIntrpt-PCell-r12            ENUMERATED {s1, s2, s4, ...}           OPTIONAL,
    availMeas-sf-r12                    ENUMERATED {s4, s5, s6, ...}           OPTIONAL
}
<<< skip unchanged part >>>
-- ASN1STOP
```

| UE-EUTRA-Capability field descriptions | FDD/ TDD diff |
|---|---|
| requiredIntrupt-PCell<br>Indicates the PCell interruption time required for inter-frequency measurements. Value s1 corresponds to 1 subframe, value s2 corresponds 2 subframes, and so on. If this field is included, the UE shall include the same number of entries listed in the same order as in *Band Parameters*. | - |
| availMeas-sf<br>Indicates the available measurements subframes required for inter-frequency measurements on which PCell interruption is not occured. Value s1 corresponds to 1 subframe, value s2 corresponds 2 subframes, and so on. If this field is included, the UE shall include the same number of entries listed in the same order as in *Band Parameters*. | - |

FIG.8

```
-- ASN1START
<<< skip unchanged part >>>
UE-EUTRA-Capability-v1130-IEs ::=   SEQUENCE {
    pdcp-Parameters-v1130               PDCP-Parameters-v1130,
    phyLayerParameters-v1130            PhyLayerParameters-v1130,
    rf-Parameters-v1130                 RF-Parameters-v1130             OPTIONAL,
    measParameters-v1130                MeasParameters-v1130,
    interRAT-ParametersCDMA2000-v1130   IRAT-ParametersCDMA2000-v1130,
    otherParameters-r11                 Other-Parameters-r11,
    fdd-Add-UE-EUTRA-Capabilities-v1130 UE-EUTRA-CapabilityAddXDD-Mode-v1130  OPTIONAL,
    tdd-Add-UE-EUTRA-Capabilities-v1130 UE-EUTRA-CapabilityAddXDD-Mode-v1130  OPTIONAL,
    nonCriticalExtension                UE-EUTRA-Capability-v1130-IEs   OPTIONAL
}

UE-EUTRA-Capability-v12xy-IEs ::=   SEQUENCE {
    rf-Parameters-v12xy                 RF-Parameters-v12xy,
    nonCriticalExtension                SEQUENCE {}                     OPTIONAL
}
<<< skip unchanged part >>>
RF-Parameters-v12xy ::=             SEQUENCE {
    supportedBandCombination-v12xy      SupportedBandCombination-v12xy
}
<<< skip unchanged part >>>
SupportedBandCombination-v12xy ::=  SEQUENCE (SIZE (1..maxBandComb-r10)) OF BandCombinationParameters-v12xy
BandCombinationParameters-v12xy ::= SEQUENCE {
    bandParameterList-r12               SEQUENCE (1..maxSimultaneousBands-r10)) OF
                                        BandParameters-v12xy            OPTIONAL,
    requiredIntrpt-PCellForDeactMeas-r12    ENUMERATED {s1, s2, s4, ...}    OPTIONAL,
    availMeas-sfForDeactMeas-r12            ENUMERATED {s4, s5, s6, ...}    OPTIONAL
}
<<< skip unchanged part >>>
BandParameters-v12xy ::= SEQUENCE {
    requiredIntrpt-PCellForIntFreq-r12      ENUMERATED {s1, s2, s4, ...}    OPTIONAL,
    availMeas-sfForIntFreq-r12              ENUMERATED {s4, s5, s6, ...}    OPTIONAL
}
...
<<< skip unchanged part >>>
-- ASN1STOP
```

FIG.9

| UE-EUTRA-Capability field descriptions | FDD/ TDD diff |
|---|---|
| requiredIntrupt-PCellForIntFreq<br>Indicates the PCell interruption time required for inter-frequency measurements. Value s1 corresponds to 1 subframe, value s2 corresponds 2 subframes, and so on. If this field is included, the UE shall include the same number of entries listed in the same order as in *Band Parameters*. | - |
| availMeas-sfForIntFreq<br>Indicates the available measurements subframes required for inter-frequency measurements on which PCell interruption is not occured. Value s1 corresponds to 1 subframe, value s2 corresponds 2 subframes, and so on. If this field is included, the UE shall include the same number of entries listed in the same order as in *Band Parameters*. | - |
| requiredIntrupt-PCellForDeactMeas<br>Indicates the PCell interruption time required for deactivated SCell measurements. Value s1 corresponds to 1 subframe, value s2 corresponds 2 subframes, and so on. If this field is included, the UE shall include the same number of entries listed in the same order as in *Band Parameters*. | - |
| availMeas-sfForDeactMeas<br>Indicates the available measurements subframes required for deactivated SCell measurements on which PCell interruption is not occured. Value s1 corresponds to 1 subframe, value s2 corresponds 2 subframes, and so on. If this field is included, the UE shall include the same number of entries listed in the same order as in *Band Parameters*. | - |

FIG.10

UE-EUTRA-Capability information element

```
-- ASN1START
<<skip unchanged part>>
UE-EUTRA-Capability-v12xy-IEs ::=   SEQUENCE {
    phyLayerParameters-v12xy            PhyLayerParameters-v12xy                    OPTIONAL,
    extended-RLC-LI-Field-r12           ENUMERATED {supported}                      OPTIONAL,
    measParameters-v12xy                MeasParameters-v12xy                        OPTIONAL,
    nonCriticalExtension                SEQUENCE {}                                 OPTIONAL
}
<<skip unchanged part>>
MeasParameters-v12xy ::=    SEQUENCE {
    supportedSgapPatternForInterFreq-r12        INTEGER (0..63)     OPTIONAL,
    supportedSgapPatternForDeactSCell-r12       INTEGER (0..1023)   OPTIONAL,
    bandCombinationListEUTRA-r12                BandCombinationListEUTRA-r12
}

BandCombinationListEUTRA-r12 ::=    SEQUENCE (SIZE (1..maxBandComb-r10)) OF BandInfoEUTRA-r12

BandInfoEUTRA ::=   SEQUENCE {
    deactSCellNeedForSgaps      BOOLEAN
    smallGapMeasBandList-r12    SmallGapMeasBandList-r12
}

SmallGapMeasBandList-r12 ::=    SEQUENCE (SIZE (1..maxBands)) OF SmallGapMeasBandInfo-r12

SmallGapMeasBandInfo-r12 ::=    SEQUENCE {
    interFreqNeedForSgaps       BOOLEAN
}
<<skip unchanged part>>
-- ASN1STOP
```

FIG.11

| UE-EUTRA-Capability field descriptions | FDD/ TDD diff |
|---|---|
| *deactSCellNeedForSgaps*<br>Indicates need for a small gap for deactivated SCell measurements on each *supportedBandCombination*. | - |
| *interFreqNeedForSgaps*<br>Indicates need for a small gap for inter-frequency measurements on each operating E-UTRA band in the *supportedBandCombination*. | - |
| *smallGapMeasBandList*<br>One entry corresponding to each supported E-UTRA band listed in the same order as in *supportedBandCombination*. | - |
| *supportedSgapForInterFreq*<br>Indicates the supported small gap pattens for inter-frequency measurements as specified in TS 36.133 [16]. Value *isgp0* corresponds to Small Gap Pattern Id "0" for inter-frequency measurements, and so on. | - |
| *supportedSgapForDeactScell*<br>Indicates the supported small gap pattens for deactivated SCell measurements as specified in TS 36.133 [16]. Value *dsgp0* corresponds to Small Gap Pattern Id "0" for deactivated Scell measurements, and so on. | - |

FIG.13

MeasGapConfig information element

```
-- ASN1START

MeasGapConfig ::=       CHOICE {
    release                 NULL,
    setup                   SEQUENCE {
        gapOffset               CHOICE {
            gp0                     INTEGER (0..39),
            gp1                     INTEGER (0..79),
            ...
        }
    }
}

MeasGapConfig-r12 ::=   CHOICE {
    release                 NULL,
    setup                   CHOICE {
        gapOffset               CHOICE {
            gp0                     INTEGER (0..39),
            gp1                     INTEGER (0..79),
            ...
        }
    },
    sGapOffset-r12          SEQUENCE {
        forInterFreq-r12            CHOICE {
            isgp40                      INTEGER (0..39),
            isgp80                      INTEGER (0..79),
            ...
        }                                                   OPTIONAL,   -- Need OP
        forDeactSCell-r12           INTEGER (0..1279)       OPTIONAL    -- Need OP
    }
}

-- ASN1STOP
```

FIG.14

| MeasGapConfig field descriptions |
|---|
| gapOffset<br>Value *gapOffset* of *gp0* corresponds to gap offset of Gap Pattern Id "0" with MGRP = 40ms, *gapOffset* of *gp1* corresponds to gap offset of Gap Pattern Id "1" with MGRP = 80ms. Also used to specify the measurement gap pattern to be applied, as defined in TS 36.133 [16]. |
| sGapOffset<br>A gap offset for small gap measurements as defined in TS 36.133 [16]. For inter-frequency measurements indicated by *forInterFreq*, value isgp40 corresponds to the GAP offset with MGRP = 40ms, and so on. For deactivated SCell measurements, value *forDeactSCell* corresponds to gap offset for the configured *measCycleSCell*. E-UTRAN shall not configure the gap offset value larger than the configured *measCycleSCell*. |

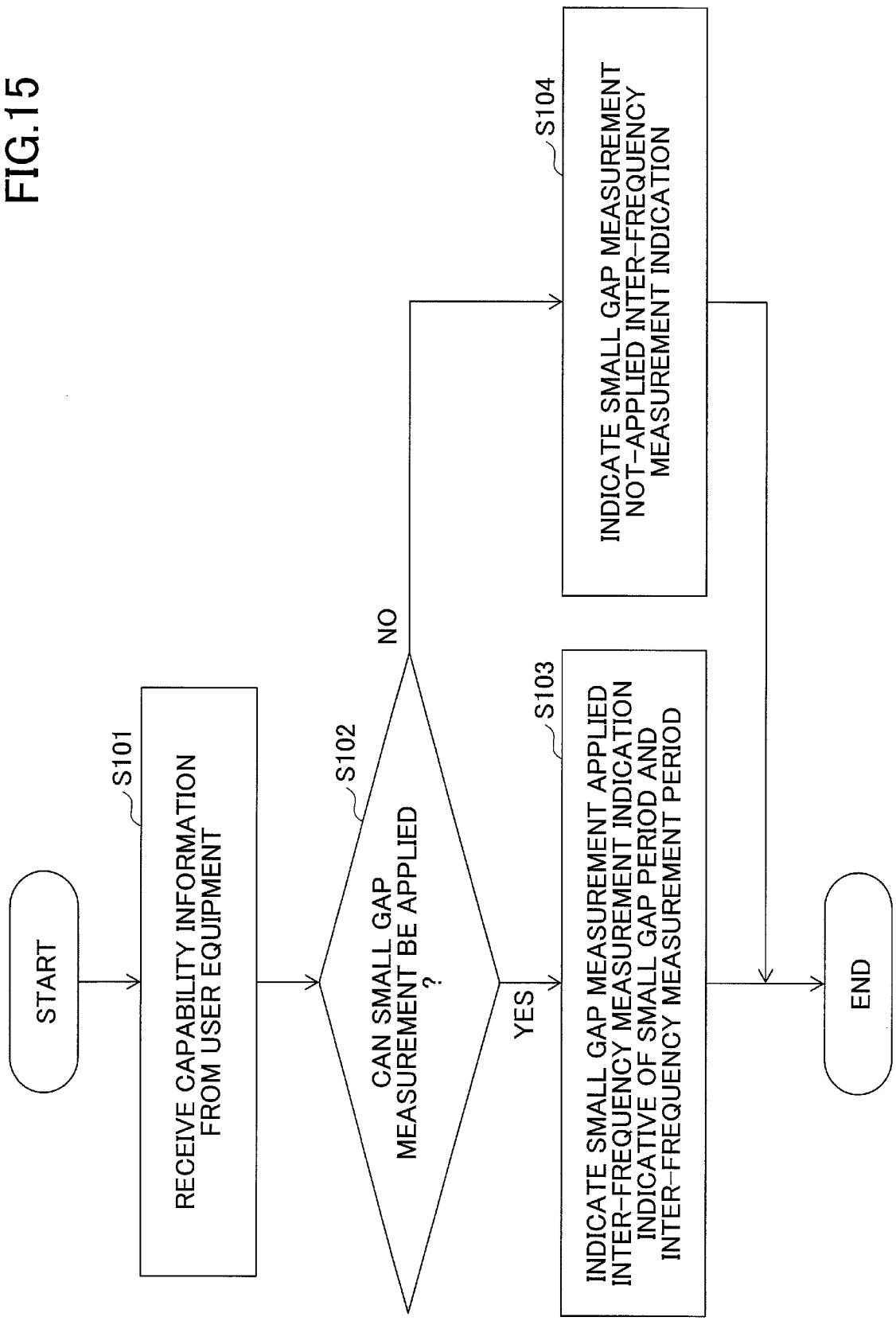

FIG.16

5.5.2.9 Measurement gap configuration

The UE shall:

1> if *measGapConfig* is set to *setup*:

2> if a measurement gap configuration is already setup, release the measurement gap configuration;

2> setup the measurement gap configuration indicated by the *measGapConfig* in accordance with the *supportedSgapPatternForInterFreq* and *supportedSgapPatternForDeactSCell as defined in 36.133* reported in the *UE-EUTRA-Capability* and the received *gapOffset* or *sGapOffset*, i.e., the first subframe of each gap occurs at an SFN and subframe meeting the following condition:

SFN mod $T$ = FLOOR((s)*gapOffset*/10);

subframe = (s)*gapOffset* mod 10;

with $T$ = MGRP/10 (for inter-frequency measurements) as defined in TS 36.133 [16] or *measCycleSCell*/10 (for deactivated SCell measurements);

1> else:

2> release the measurement gap configuration;

USER EQUIPMENT, BASE STATION, AND METHOD FOR INDICATING INTER-FREQUENCY MEASUREMENT TO A USER EQUIPMENT FROM A BASE STATION

TECHNICAL FIELD

The present invention relates to a radio communication system.

BACKGROUND ART

Presently, introduction of carrier aggregation using multiple frequency bands is being promoted. It is envisaged that multiple RF (Radio Frequency) circuits are provided in user equipment supporting the carrier aggregation. It is envisaged that since the RF circuits specific to the respective frequency bands are provided in the user equipment, the user equipment can perform inter-frequency measurement without need of configuring measurement gap.

Meanwhile, it is discussed that the user equipment supporting the carrier aggregation with multiple frequency bands is implemented in a single RF circuit. By implementing the user equipment in the single RF circuit, some effects such as reduction in power consumption or fabrication costs are expected. In this case, the measurement gap must be configured for the user equipment to perform the inter-frequency measurement, and the implementation is discussed in the course of standardization.

As illustrated in FIG. 1, the length of the existing measurement gap is typically set to 6 ms, and the user equipment is not allowed to receive downlink data in that period. In addition, if a period for HARQ (Hybrid Automatic Repeat Request) feedback of ACK/NACK to be returned after 4 ms for transmitted data is reserved, the period of 4 ms preceding the measurement gap cannot be also substantially used to transmit the downlink data. This is similar to uplink data, and for example, in cases of FDD, the user equipment is not allowed to transmit the uplink data in a period of 6 ms and a period of 1 ms after the measurement gap.

As one solution to shorten the unavailable transmission period, small gap measurement is proposed. In the small gap measurement, as illustrated in FIG. 2, in the first and last two subframes (small gap period) of the existing measurement gap, the user equipment interrupts communication with a camped base station so as to measure other cells targeted for the inter-frequency measurement and performs preparation operations for the inter-frequency measurement such as adjustment of the RF circuit. The user equipment not only performs the inter-frequency measurement but also receives downlink data from the camped base station in subframes sandwiched between the two subframes.

See 3GPP R4-140766 "Discussion on interruptions in measurement without gaps" in details, for example.

SUMMARY OF INVENTION

Problem to be Solved by the Invention

In the embodiment as illustrated in FIG. 2, the first and last two subframes (2 ms) in the measurement gap of 6 ms are preset as the small gap period, and upon receiving a small gap measurement applied inter-frequency measurement indication, the user equipment interrupts communication with the camped base station to prepare the inter-frequency measurement in the small gap period.

However, there is a likelihood that the small gap period may have to be set to be longer than 2 ms due to difference and separation between bandwidths of a camped cell and a to-be-measured cell, capability of the RF circuit in the user equipment or the like. Also, the inter-frequency measurement period of 4 ms may be also insufficient.

In light of the above-stated problem, one object of the present invention is to provide techniques for implementing the inter-frequency measurement with the flexible small gap measurement corresponding to the capability of user equipment and/or the to-be-measured cell.

Means for Solving the Problem

In order to achieve the above object, one aspect of the present invention relates to user equipment for transmitting and receiving radio signals to/from a base station, comprising: a capability information indication unit configured to indicate capability information of the user equipment to the base station; and an inter-frequency measurement unit configured to perform, upon receiving a small gap measurement applied inter-frequency measurement indication from the base station, a small gap measurement applied inter-frequency measurement in accordance with a small gap period for causing communication with the base station to be interrupted and an inter-frequency measurement period indicated in the inter-frequency measurement indication.

Another aspect of the present invention relates to abase station for transmitting and receiving radio signals to/from user equipment, comprising: a capability information acquisition unit configured to acquire capability information from the user equipment, wherein the capability information includes one or more information elements of small gap measurement applicability information indicative of applicability of small gap measurement in respective to-be-measured carriers, a small gap period for causing communication with the base station to be interrupted in the small gap measurement and an inter-frequency measurement period; and an inter-frequency measurement indication unit configured to indicate a small gap measurement applied inter-frequency measurement indication indicative of the small gap period and the inter-frequency measurement period to the user equipment based on the capability information acquired from the user equipment.

A still further embodiment of the present invention relates to a method for a base station to indicate inter-frequency measurement to user equipment, comprising: acquiring capability information from the user equipment, wherein the capability information includes one or more information elements of small gap measurement applicability information indicative of applicability of small gap measurement in respective to-be-measured carriers, a small gap period for causing communication with the base station to be interrupted in the small gap measurement and an inter-frequency measurement period; determining whether the small gap measurement is applicable in the respective to-be-measured carriers based on the capability information acquired from the user equipment; and upon determining that the small gap measurement is applicable in all the to-be-measured carriers, indicating an inter-frequency measurement indication indicative of an indication to apply the small gap measurement to the user equipment, the indication indicating the small gap period and the inter-frequency measurement period.

Advantage of the Invention

According to the present invention, it is possible to provide techniques for implementing the inter-frequency measurement with the flexible small gap measurement corresponding to the capability of user equipment and/or the to-be-measured cell.

BRIEF DESCRIPTION OF DRAWINGS

FIG. 6 is a diagram for illustrating exemplary capability information according to one embodiment of the present invention;

FIG. 7 is a diagram for illustrating various fields related to the capability information according to one embodiment of the present invention;

FIG. 8 is a diagram for illustrating the exemplary capability information according to one embodiment of the present invention;

FIG. 9 is a diagram for illustrating various fields related to the capability information according to one embodiment of the present invention;

FIG. 10 is a diagram for illustrating the exemplary capability information according to one embodiment of the present invention;

FIG. 11 is a diagram for illustrating various fields related to the capability information according to one embodiment of the present invention;

FIG. 13 is a diagram for illustrating an exemplary inter-frequency measurement indication according to one embodiment of the present invention;

FIG. 14 is a diagram for illustrating various fields related to the inter-frequency measurement indication according to one embodiment of the present invention;

FIG. 15 is a flowchart for illustrating an inter-frequency measurement indication operation in a base station according to one embodiment of the present invention; and FIG. 16 is a diagram for illustrating an exemplary setup operation of measurement gap configuration according to one embodiment of the present invention.

EMBODIMENTS OF THE INVENTION

Embodiments of the present invention are described below with reference to the drawings.

User equipment supporting small gap measurement applied inter-frequency measurement is disclosed. In embodiments as stated below, upon receiving capability information from the user equipment, a base station determines whether the small gap measurement applied inter-frequency measurement is allowed in a to-be-measured carrier for the user equipment. The capability information includes small gap measurement applicability information indicative of applicability of the small gap measurement in respective carriers supported by the user equipment. The capability information may further include a small gap period indicative of a period for causing communication with the base station to be interrupted in the small gap measurement applied inter-frequency measurement for the respective small gap measurement applicable carriers and an inter-frequency measurement period indicative of a period sandwiched between the small gap periods and indicating a period for which the user equipment performs the inter-frequency measurement in receiving downlink data from the base station. Upon receiving an inter-frequency measurement indication indicating that the small gap measurement with the small gap period and the inter-frequency measurement period should be applied from the base station, the user equipment performs the small gap measurement applied inter-frequency measurement for respective to-be-measured cells in accordance with the small gap period and the inter-frequency measurement period indicated from the base station. As a result, the inter-frequency measurement with the flexible small gap measurement corresponding to capability of the user equipment and the to-be-measured cells can be implemented compared to the conventional small gap measurement applied inter-frequency measurement where the small gap period and the inter-frequency measurement period are fixed.

Figure 1:
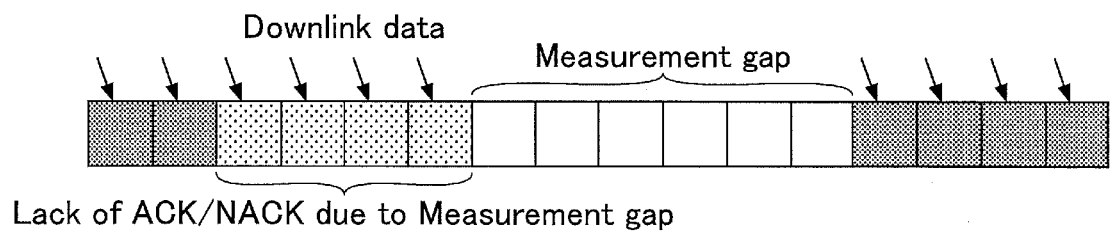
FIG. 1 is a schematic diagram for illustrating an inter-frequency measurement timing with a single RF circuit.
Figure 2:
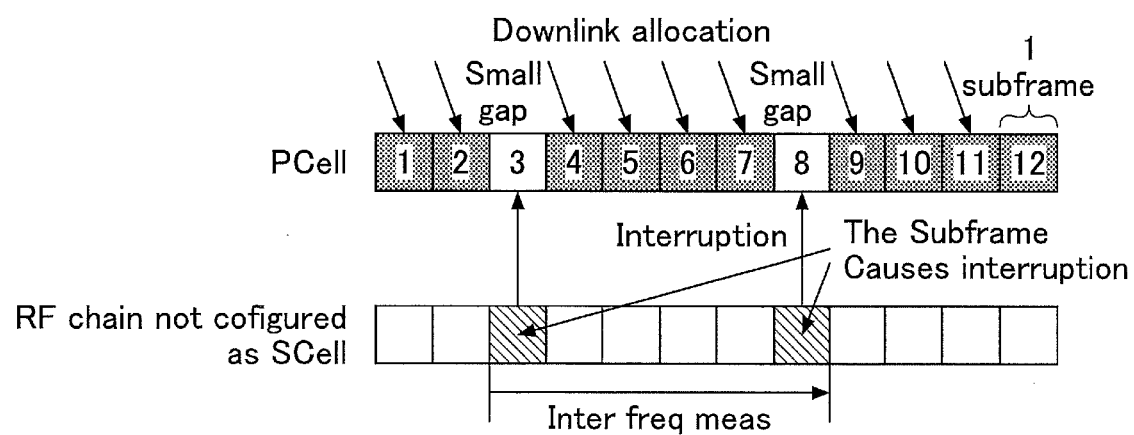
FIG. 2 is a schematic diagram for illustrating small gap measurement.
Figure 3:
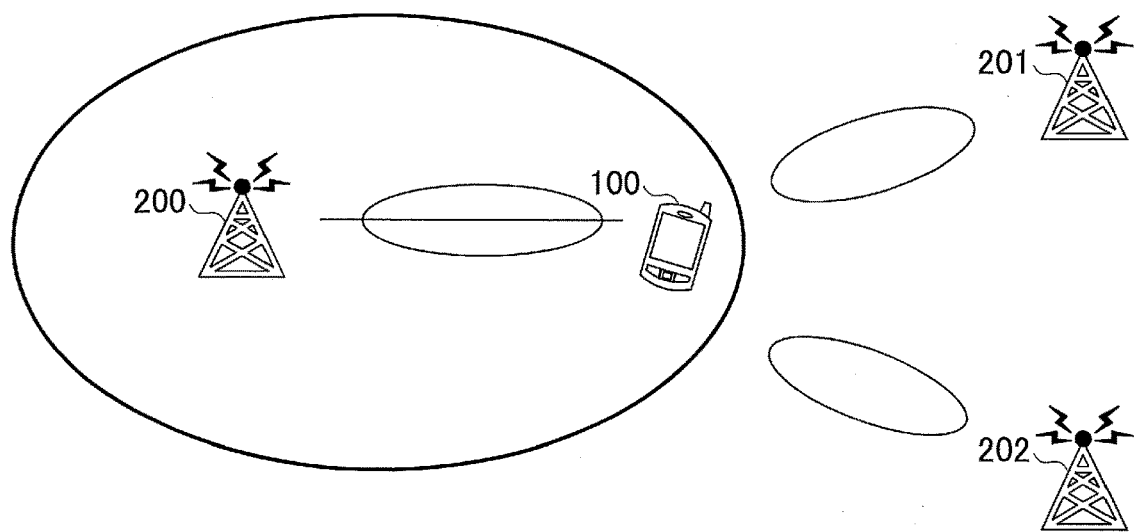
FIG. 3 is a schematic diagram for illustrating a radio communication system according to one embodiment of the present invention.

A radio communication system according to one embodiment of the present invention is described with reference to FIG. 3. FIG. 3 is a schematic diagram for illustrating a radio communication system according to one embodiment of the present invention.

As illustrated in FIG. 3, a radio communication system 10 has user equipment 100 and base stations 200-202. In the radio communication system 10, the user equipment 100 uses one or more of cells served by the multiple base stations 200-202 for communication. In the illustrated embodiment, the user equipment 100 is camped in the base station 200. Also, the base stations 201, 202 are disposed as adjacent base stations of the base station 200, and if a communication state with the base station 200 is degraded, the user equipment 100 can continue communication by handover to either of the adjacent base stations 201, 202. Also, if the user equipment 100 has a carrier aggregation function, the base station 200 serving a primary cell may configure the cells served by the adjacent base stations 201, 202 as secondary cells for the user equipment 100.

In order to perform the handover and configure a new cell in the carrier aggregation, the user equipment 100 is requested to perform the inter-frequency measurement to measure communication states with the adjacent base stations 201, 202. In the inter-frequency measurement period, an RF circuit is switched into a frequency band different from the cell served by the camped base station 200, and the user equipment 100 cannot communicate with the camped base station 200.

In order to shorten the unavailable transmission period, the user equipment 100 has a small gap measurement function where communication with the base station 200 is interrupted only in the small gap period indicated by the base station 200. Typically, as illustrated, the user equipment 100 may be any appropriate information processing device with a radio communication function such as a smartphone, a mobile phone, a tablet and a mobile router. The user equipment 100 is arranged with a CPU (Central Processing Unit) such as a processor, a memory device such as a RAM (Random Access Memory) and a flash memory, an RF circuit to transmit and receive radio signals to/from the base stations 200-202, or the like. Since the RF circuit according to this embodiment is composed of a single chip, the user equipment 100 has to temporarily interrupt communication with a camped cell to perform the inter-frequency measurement. Functions and operations of the user equipment 100 as stated below may be implemented by the CPU processing and running data and programs stored in the memory device. However, the user equipment 100 is not limited to the above-stated hardware configuration and may be arranged with circuits for implementing one or more of operations as stated below.

The base stations 200-202 establish a radio connection to the user equipment 100 to transmit downlink (DL) packets received from network devices, such as an upper station and a server, communicatively connected on a core network (not shown) to the user equipment 100 as well as transmit uplink (UL) packets received from the user equipment 100 to the network devices. In the illustrated embodiment, the base station 200 serves as a camped base station, and the base stations 201, 202 serve as adjacent base stations. If a communication state with the user equipment 100 is degraded, the base station 200 may indicate handover to the adjacent base stations 201, 202 to the user equipment 100. Also, if the user equipment 100 has a carrier aggregation function, the base station 200 may configure a cell of a different frequency band served by the base station 200 as a secondary cell for the user equipment 100 (intra-carrier aggregation) or configure a cell served by the adjacent base stations 201, 202 as a secondary cell (dual connectivity).

The base stations 200-202 are typically arranged with hardware resources such as an antenna for transmitting and receiving radio signals to/from the user equipment 100, a communication interface for communicating with the core network, a processor and a circuit for processing signals transmitted and received to/from the user equipment 100 and the core network. Functions and operations of the base stations 200-202 as stated below may be implemented by the processor processing and running data and programs stored in the memory device. However, the base stations 200-202 are not limited to the above-stated hardware configuration and may have any other appropriate hardware configuration.

Figure 4:
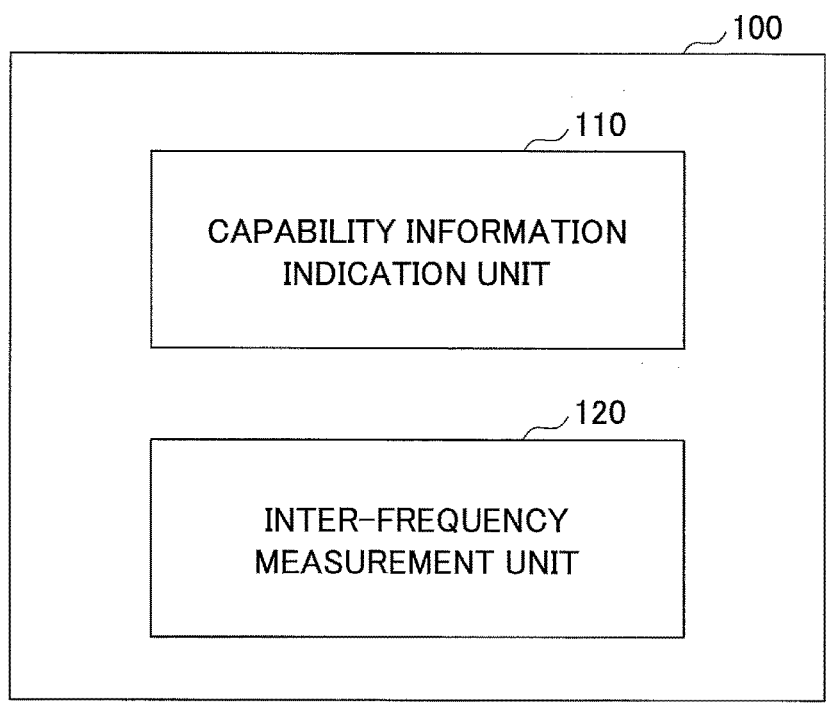
FIG. 4 is a block diagram for illustrating an arrangement of user equipment according to one embodiment of the present invention.

Next, the user equipment according to one embodiment of the present invention is described with reference to FIG. 4. FIG. 4 is a block diagram for illustrating an arrangement of the user equipment according to one embodiment of the present invention.

As illustrated in FIG. 4, the user equipment 100 has a capability information indication unit 110 and an inter-frequency measurement unit 120.

The capability information indication unit 110 indicates capability information of the user equipment 100 to the base station 200. Specifically, the user equipment 100 indicates a frequency band, a bandwidth and various functions such as a carrier aggregation function supported by the user equipment 100 as the capability information to the base station 200.

In one embodiment, the capability information indication unit 110 may indicate small gap measurement applicability information indicative of applicability of small gap measurement in respective to-be-measured carriers and a small gap period for the small gap measurement applicable carriers as the capability information to the base station 200. For example, the capability information indication unit 110 prestores the small gap measurement applicability information indicating whether the small gap measurement is applicable in respective carriers or respective frequency bands available to an RF circuit in the user equipment 100 for communication. For example, in cases where the RF circuit in the user equipment 100 can communicate in carriers A, B and C of mutually different frequency bands and the small gap measurement is applicable in carriers A and C while the small gap measurement is not applicable in carrier B, the capability information indication unit 110 would have the small gap measurement applicability information indicating that the small gap measurement is applicable in carriers A and C while the small gap measurement is not applicable in carrier B.

Figure 5:
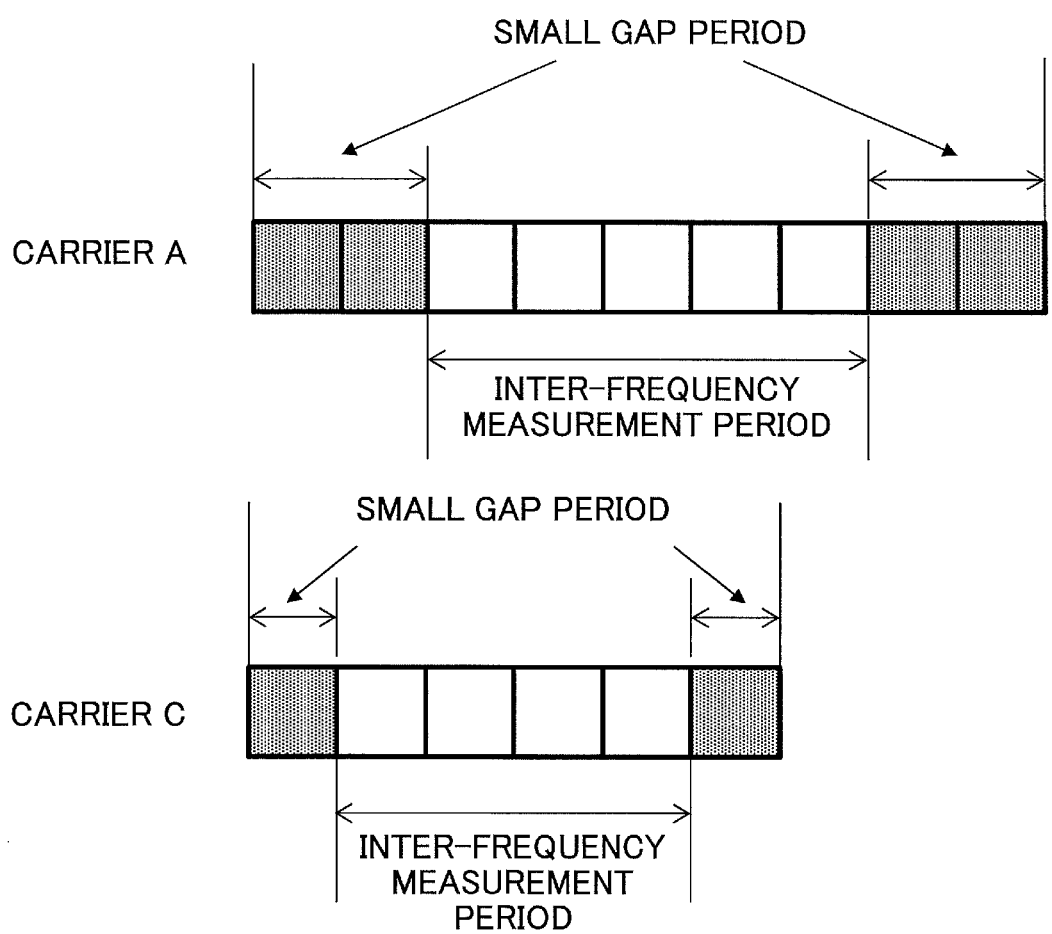
FIG. 5 is a schematic diagram for illustrating small gap measurement applied inter-frequency measurement timings according to one embodiment of the present invention.

As illustrated in FIG. 5, the capability information indication unit 110 further indicates small gap periods required to perform the small gap measurement applied inter-frequency measurement for the respective small gap measurement applicable carriers A and C. The small gap periods are configured to sandwich inter-frequency measurement periods as illustrated and are periods for causing communication with the base station 200 to be interrupted so as to switch the RF circuit from a camped carrier to a carrier targeted for the inter-frequency measurement. In the illustrated embodiment, carrier A needs the small gap period of four subframes (4 ms), and carrier C needs the small gap period of two subframes (2 ms). In this case, the capability information indication unit 110 indicates the small gap periods of 4 ms and 2 ms for the small gap measurement applicable carriers A and C, respectively, to the base station 200.

In one embodiment, the capability information indication unit 110 may further indicate the inter-frequency measurement period, where the user equipment 100 can communicate with the base station 200, as the capability information to the base station 200. As illustrated in FIG. 5, in the small gap measurement, the user equipment 100 temporarily interrupts the communication with the base station 200 for the inter-frequency measurement such as tuning the RF circuit to the carrier targeted for the inter-frequency measurement. After tuning the RF circuit, the user equipment 100 restarts the communication with the base station 200 and performs the inter-frequency measurement in receiving downlink data from the base station 200. In the conventional small gap measurement, the inter-frequency measurement period is fixed to a predetermined period such as 4 ms. However, there is a likelihood that the inter-frequency measurement period may be also different for different user equipments and/or different to-be-measured carriers, and it is preferred that the inter-frequency measurement period be variably configured corresponding to the user equipments and/or the carriers performing the small gap measurement applied inter-frequency measurement. As a result, the capability information indication unit 110 may indicate the inter-frequency measurement period for small gap measurement applicable carriers as the capability information to the base station 200 in addition to the small gap measurement applicability information and the small gap period as stated above. In the illustrated embodiment, the inter-frequency measurement period of five subframes (5 ms) is required for carrier A, and the inter-frequency measurement period of four subframes (4 ms) is required for carrier C. In this case, the capability information indication unit 110 indicates the respective inter-frequency measurement periods of 5 ms and 4 ms for the small gap measurement applicable carriers A and C, respectively, to the base station 200.

Note that although the period sandwiched by the small gap period is defined as the inter-frequency measurement period in the embodiment, the present invention is not limited to it, and a total period of the small gap period and the period sandwiched by the small gap period may be defined as the inter-frequency measurement period. In this case, the inter-frequency measurement periods of carriers A and B would be nine subframes (9 ms) and six subframes (6 ms), respectively.

In one embodiment, at timing of connecting to the base station 200 and/or in response to a request from the base station 200, the capability information indication unit 110 provides the base station 200 with the small gap measurement applicability information as the capability information of the user equipment 100. Specifically, in LTE standard, the capability information indication unit 110 may indicate the capability information including the small gap period and the inter-frequency measurement period to the base station 200 in a data structure as illustrated in FIG. 6. Also, as illustrated in FIG. 7, the small gap period may be indicated in the information field "requiredIntrupt-PCell", and the inter-frequency measurement period may be indicated in the information field "availMeas-sf".

In another embodiment, the capability information indication unit 110 may further indicate the small gap period and the inter-frequency measurement period corresponding to a measurement use type as the capability information to the base station 200. Specifically, the inter-frequency measurement may be performed for different measurement uses such as for performing handover, for configuring a new cell in carrier aggregation, for measuring a configured secondary cell of an inactive state, or the like. Then, it is considered that it may be advantageous to configure the small gap period and the inter-frequency measurement period suitable for the respective measurement uses, and the small gap periods and the inter-frequency measurement periods suitable for the various measurement uses may be predefined. Specifically, the user equipment 100 may store the small gap periods and the inter-frequency measurement periods corresponding to the measurement use types, and the capability information indication unit 110 may indicate the small gap period and the inter-frequency measurement period corresponding to the measurement use type to the base station 200. Then, the base station 200 can indicate the small gap measurement indicative of the small gap period and the inter-frequency measurement period suitable for the measurement use based on the small gap periods and the inter-frequency measurement periods corresponding to the measurement use types.

Specifically, in the LTE standard, the capability information indication unit 110 may indicate the small gap period "requiredIntrupt-PCellForIntFreq" and the inter-frequency measurement period "availMeas-sfForintFreq" for handover measurement and the small gap period "requiredIntrup-PCelForDeactMeas" and the inter-frequency measurement period "availMeas-sfForDeactMeas" for measurement of secondary cells of an inactive state to the base station 200 in data structures as illustrated in FIGS. 8 and 9.

Note that the small gap period and the inter-frequency measurement period may be reported in specific numerical values or be indicated in certain indicators (IDs) associated with certain numerical ranges. In the latter case, for example, "ID1" may be associated with a small gap measurement pattern "the first half small gap period of 1 ms+the inter-frequency measurement period of 4 ms+the second half small gap period of 1 ms". Then, the capability information indication unit 110 may indicate an ID for handover measurement "supportedSgapForinterFreq" and an ID for measurement of a secondary cell of an inactive state "supportedSgapForDeactScell" to the base station 200 in data structures as illustrated in FIGS. 10 and 11.

In the illustrated example, the measurement for handover and the measurement for secondary cells of an inactive state have been exemplified as the measurement use types for the inter-frequency measurement, but is not limited to it, and the small gap period and the inter-frequency measurement period may be configured for any other inter-frequency measurement use. Also, common values may be configured for the small gap period and the inter-frequency measurement period corresponding to the above-stated measurement use type, but is not limited to it, and for example, specific values may be configured for each carrier.

The inter-frequency measurement unit 120 performs, upon receiving a small gap measurement applied inter-frequency measurement indication from the base station 200, small gap measurement applied inter-frequency measurement in accordance with a small gap period for causing communication with the base station to be interrupted and an inter-frequency measurement period indicated in the inter-frequency measurement indication.

In one embodiment, the inter-frequency measurement indication may be indicated with a measurement gap pattern ID provided corresponding to the indicated small gap period and inter-frequency measurement period. Specifically, the measurement gap pattern ID may be predefined corresponding to the small gap period and the inter-frequency measurement period, and upon receiving the measurement gap pattern ID, the inter-frequency measurement unit 120 may perform the small gap measurement applied inter-frequency measurement with the corresponding small gap period and inter-frequency measurement period.

Alternatively, in another embodiment, the inter-frequency measurement indication may be to perform the small gap measurement applied inter-frequency measurement with the small gap period and the inter-frequency measurement period scheduled by the base station 200 regardless of the measurement gap ID.

Alternatively, the inter-frequency measurement indication may indicate the small gap period and the inter-frequency measurement period corresponding to the measurement use type. Upon receiving the inter-frequency measurement indication, the inter-frequency measurement unit 120 performs the small gap measurement applied inter-frequency measurement for the measurement use with the indicated small gap period and inter-frequency measurement period.

On the other hand, upon receiving a small gap measurement not-applied inter-frequency measurement indication from the base station 200, the inter-frequency measurement unit 120 performs the inter-frequency measurement corresponding to the indicated measurement gap pattern ID without applying the small gap measurement. Specifically, similar to the conventional inter-frequency measurement, the inter-frequency measurement unit 120 performs the inter-frequency measurement for the whole measurement gap (for example, 6 ms) corresponding to the measurement gap pattern ID.

If the small gap measurement applied inter-frequency measurement is performed for multiple carriers or frequency bands, the inter-frequency measurement unit 120 may perform the small gap measurement applied inter-frequency measurement for the first carrier or frequency band at the first iteration in iteratively performed measurement gap, the small gap measurement applied inter-frequency measurement for the second carrier or frequency band at the second iteration, and so on. Different small gap periods and inter-frequency measurement periods for the multiple carriers may be indicated to the base station 200 as the capability information. Although the base station 200 may indicate the different small gap periods and inter-frequency measurement periods for the respective carriers, it is preferred that the base station 200 indicate common small gap period and inter-frequency measurement period for the respective carriers in order to avoid complication of the inter-frequency measurement.

Results of the performed inter-frequency measurement are reported to the base station 200 as needed.

Figure 12:
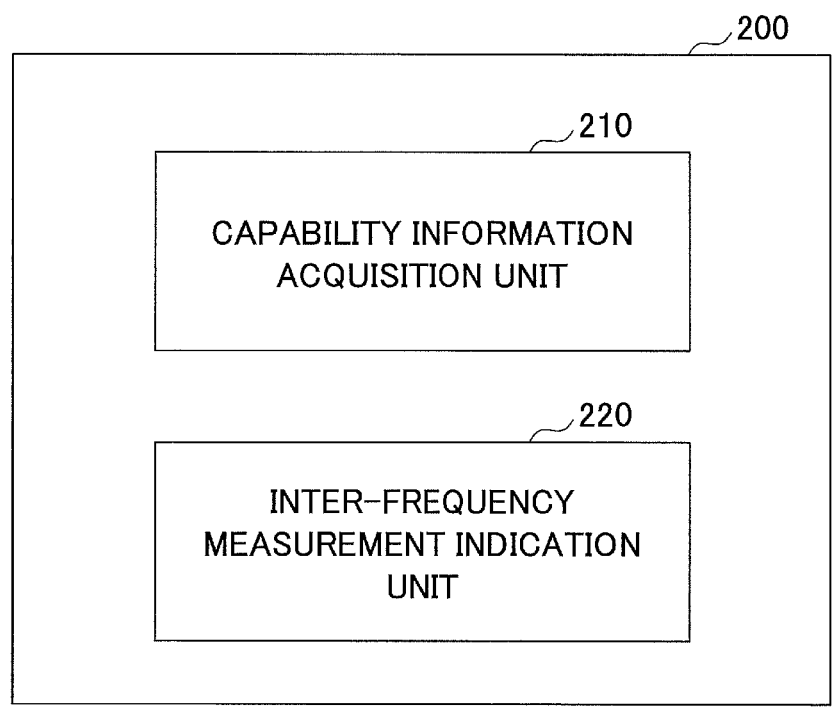
FIG. 12 is a block diagram illustrating an arrangement of a base station according to one embodiment of the present invention.

Next, the base station according to one embodiment of the present invention is described with reference to FIGS. 12-14. FIG. 12 is a block diagram for illustrating an arrangement of the base station according to one embodiment of the present invention.

As illustrated in FIG. 12, the base station 200 has a capability information acquisition unit 210 and an inter-frequency measurement indication unit 220.

The capability information acquisition unit 210 acquires capability information, including one or more information elements of small gap measurement applicability information indicative of applicability of small gap measurement in respective to-be-measured carriers, a small gap period for causing communication with the base station 200 to be interrupted in the small gap measurement and an inter-frequency measurement period, from the user equipment 100. Specifically, the capability information acquisition unit 210 may acquire these information elements from the user equipment 100 at timing of connecting to the base station 200 or in response to a request from the base station 200. As stated above, the small gap measurement applicability information indicates whether the small gap measurement is applicable to respective carriers or frequency bands that can be measured by the user equipment 100. The small gap period indicates a period for which the communication with the base station 200 is interrupted in the small gap measurement applied inter-frequency measurement, and the inter-frequency measurement period, which is sandwiched between the small gap periods, indicates a period for which the user equipment 100 performs the inter-frequency measurement in receiving downlink data from the base station 200.

The inter-frequency measurement indication unit 220 indicates a small gap measurement applied inter-frequency measurement indication indicative of the small gap period to the user equipment 100 based on the capability information acquired from the user equipment 100. For example, the inter-frequency measurement indication unit 220 may indicate the inter-frequency measurement indication to the user equipment 100 in accordance with any trigger such as degradation of a communication state with the user equipment 100 or in a periodic manner.

In one embodiment, the inter-frequency measurement indication unit 220 determines whether the small gap measurement is applicable to respective to-be-measured carriers based on the acquired small gap measurement applicability information and if the small gap measurement is applicable to all the to-be-measured carriers, indicates an indication to cause the small gap measurement to be applied as well as an inter-frequency measurement indication indicative of the small gap period to the user equipment 100. According to the embodiment in FIG. 5, the user equipment 100 can apply the small gap measurement to carriers A and C and cannot apply the small gap measurement to carrier B. Accordingly, if carriers A and C are to be measured, the inter-frequency measurement indication unit 220 may indicate to the user equipment 100 the inter-frequency measurement indication indicating that the small gap measurement should be applied. For example, the indication may be fulfilled with the inter-frequency measurement indication including a small gap measurement configuration indication assigned to TRUE. On the other hand, if the carrier B is included in the to-be-measured carriers, the inter-frequency measurement indication unit 220 indicates a small gap measurement not-applied inter-frequency measurement indication to the user equipment 100. For example, the indication does not include the small gap measurement configuration indication, and the inter-frequency measurement indication including only the measurement gap pattern ID for identifying a measurement gap may be indicated to the user equipment 100. Also, according to the embodiment in FIG. 5, if carrier A is to be measured in the small gap measurement applied inter-frequency measurement, the inter-frequency measurement indication unit 220 may indicate the inter-frequency measurement indication indicative of the small gap period of four subframes (4 ms) to the user equipment 100. Meanwhile, if carrier C is to be measured in the small gap measurement applied inter-frequency measurement, the inter-frequency measurement indication unit 220 may indicate the inter-frequency measurement indication indicative of the small gap period of two subframes (2 ms) to the user equipment 100.

In one embodiment, the inter-frequency measurement indication unit 220 may indicate the small gap measurement applied inter-frequency measurement indication further indicative of an inter-frequency measurement period sandwiched by the small gap period to the user equipment 100. In the conventional small gap measurement, the inter-frequency measurement period is fixed to a predetermined period such as 4 ms. However, the inter-frequency measurement period may be also different for different user equipments and/or different to-be-measured carriers, and it is preferred that the inter-frequency measurement period be variably configured corresponding to the user equipment and/or the carrier performing the small gap measurement applied inter-frequency measurement. According to the embodiment in FIG. 5, if carrier A is to be measured in the small gap measurement applied inter-frequency measurement, the inter-frequency measurement indication unit 220 may indicate the inter-frequency measurement indication indicative of the inter-frequency measurement period of five subframes (5 ms) to the user equipment 100. On the other hand, if carrier C is to be measured in the small gap measurement applied inter-frequency measurement, the inter-frequency measurement indication unit 220 may indicate the inter-frequency measurement indication indicative of the small gap period of four subframes (4 ms).

In one embodiment, when the inter-frequency measurement indication unit 220 indicates the small gap measurement applied inter-frequency measurement indication for multiple carriers to the user equipment 100, the inter-frequency measurement indication unit 220 may indicate the small gap period and the inter-frequency measurement period for a carrier having the maximum total period in the total periods of the small gap period and the inter-frequency measurement period for the multiple carriers. In the embodiment in FIG. 5, when the small gap measurement applied inter-frequency measurement indication for both carriers A and C is indicated to the user equipment 100, the inter-frequency measurement indication unit 220 indicates the small gap period (4 ms) and the inter-frequency measurement period (5 ms) of carrier A having the longer total period to the user equipment 100. As a result, the user equipment 100 can apply the common small gap period and inter-frequency measurement period to the inter-frequency measurement in carriers A and C.

In another embodiment, the capability information acquisition unit 210 may acquire the small gap period and the inter-frequency measurement period corresponding to a measurement use type as the capability information from the user equipment 100. In this case, the inter-frequency measurement indication unit 220 may indicate the inter-frequency measurement indication indicative of the small gap period and the inter-frequency measurement period corresponding to the measurement use to the user equipment 100 based on the small gap period and the inter-frequency measurement period corresponding to the measurement use type acquired from the user equipment 100. For example, it is assumed that the capability information acquisition unit 210 has received the small gap period and the inter-frequency measurement period for handover measurement and the small gap period and the inter-frequency measurement period for measurement of secondary cells of an inactive state. Then, if the inter-frequency measurement for handover measurement is indicated to the user equipment 100, the inter-frequency measurement indication unit 220 may indicate to the user equipment 100 the inter-frequency measurement indication indicative of the small gap period and the inter-frequency measurement period for handover measurement reported from the user equipment 100. On the other hand, if the inter-frequency measurement for measurement of secondary cells of the inactive state is indicated to the user equipment 100, the inter-frequency measurement indication unit 220 may indicate to the user equipment 100 the inter-frequency measurement indication indicative of the small gap period and the inter-frequency measurement period for measurement of secondary cells of the inactive state reported from the user equipment 100. Accordingly, the user equipment 100 can perform the inter-frequency measurement with the small gap period and the inter-frequency measurement period suitable for the measurement use type.

Specifically, in the LTE standard, the inter-frequency measurement indication unit 220 may indicate the inter-frequency measurement indication indicative of the small gap period and the inter-frequency measurement period for handover measurement and the small gap period and the inter-frequency measurement period for measurement of secondary cells of the inactive state to the user equipment 100 in data structures as illustrated in FIGS. 13 and 14. Specifically, the inter-frequency measurement indication unit 220 may indicate that the small gap period and the inter-frequency measurement period for handover measurement should be applied by configuring respective values for "isgp" in "forInterFreq" in the "sGapOffset" field or indicate that the small gap period and the inter-frequency measurement period for measurement of secondary cells of the inactive state should be applied by configuring respective values for "forDeactSCell" in the field "sGapOffset".

Next, inter-frequency measurement indication operations by the base station according to one embodiment of the present invention are described with reference to FIG. 15. FIG. 15 is a flowchart for illustrating inter-frequency measurement indication operations in the base station according to one embodiment of the present invention.

As illustrated in FIG. 15, at step S101, the base station 200 receives capability information from the user equipment 100. The capability information includes one or more information elements of small gap measurement applicability information indicative of applicability of small gap measurement in respective to-be-measured carriers, a small gap period for causing communication with the base station 200 to be interrupted in the small gap measurement and an inter-frequency measurement period sandwiched between the small gap periods. For example, the base station 200 may acquire the capability information at timing of connecting to the user equipment 100 or the like.

At step S102, the base station 200 determines whether the small gap measurement is applicable in the respective to-be-measured carriers based on the small gap measurement applicability information in the received capability information.

If the small gap measurement is applicable in all the to-be-measured carriers (S102: YES), at step S103, the base station 200 indicates to the user equipment 100 a small gap measurement configuration indication indicating that the small gap measurement should be applied as well as an inter-frequency measurement indication including a small gap period and an inter-frequency measurement period. Here, if the single carrier is to be measured, the base station 200 indicates the small gap measurement applied inter-frequency indication indicative of the small gap period and the inter-frequency measurement period acquired for that carrier at step S101. On the other hand, if the multiple carriers are to be measured, the base station 200 determines the small gap period and the inter-frequency measurement period for the carrier having the maximum total period in the total periods of the small gap period and the inter-frequency measurement period for the multiple carriers and indicates the small gap measurement applied inter-frequency measurement indicative of the determined small gap period and inter-frequency measurement period.

On the other hand, if the small gap measurement is not applicable to at least one of the to-be-measured carriers (S102: NO), at step S104, the base station 200 indicates the small gap measurement not-applied inter-frequency measurement to the user equipment 100. Specifically, the base station 200 indicates the inter-frequency measurement indication indicative of a measurement gap ID to the user equipment 100 without including the small gap measurement configuration indication.

After that, the user equipment 100 performs the small gap measurement applied inter-frequency measurement or the small gap measurement not-applied inter-frequency measurement corresponding to the received inter-frequency measurement indication.

FIG. 16 is a diagram for illustrating exemplary configuration operations of measurement gap configuration according to one embodiment of the present invention. As illustrated in FIG. 16, the user equipment 100 may configure the inter-frequency measurement in accordance with an ID for handover measurement "supportedSgapPatternForDeactScell", an ID for measurement of secondary cells of an inactive state "supportedSgapPatterForDeactScell" and "gapOffset" or "sGapOffset" in the reported capability information.

Although the embodiments of the present invention have been described in detail, the present invention is not limited to the above-stated specific embodiments, and various modifications and variations can be made within the spirit of the present invention as recited in claims.

This international patent application claims the benefit of priority based on Japanese Priority Applications No. 2014-097362 filed on May 9, 2014 and No. 2014-199399 filed on Sep. 29, 2014, the entire contents of which are hereby incorporated by reference.

LIST OF REFERENCE SYMBOLS

10: radio communication system
100: user equipment
110: capability information indication unit 120: inter-frequency measurement unit
200-202: base station
210: capability information acquisition unit
220: inter-frequency measurement indication unit

The invention claimed is:

1. A user equipment, comprising:
a receiver that receives radio signals from a base station;
a transmitter that transmits signals to the base station; and
a processor that:
 causes the transmitter to transmit capability information of the user equipment to the base station; and
 upon the receiver receiving a small gap measurement applied inter-frequency measurement indication from the base station, performs a small gap measurement applied inter-frequency measurement in accordance with:
  a small gap period for causing communication with the base station to be interrupted and
  an inter-frequency measurement period indicated in the inter-frequency measurement indication,
 wherein:
  the small gap period and the inter-frequency measurement period correspond to a measurement gap pattern ID indicated in the inter-frequency measurement indication, the small gap period causing the inter-frequency measurement period to be sandwiched,
  the measurement gap pattern ID is predefined based on the small gap period and the inter-frequency gap period, and
  the small gap measurement applied inter-frequency measurement is an inter-frequency measurement to which a small gap measurement is applied.

2. The user equipment as claimed in claim 1, wherein the processor causes the transmitter to transmit small gap measurement applicability information indicative of applicability of the small gap measurement in respective to-be-measured carriers and the small gap period for the small gap measurement applicable carriers as the capability information to the base station.

3. The user equipment as claimed in claim 1, wherein the processor further causes the transmitter to transmit the inter-frequency measurement period as the capability information to the base station.

4. The user equipment as claimed in claim 1, wherein the processor further causes the transmitter to transmit the small gap period and the inter-frequency measurement period corresponding to a measurement use type as the capability information to the base station.

5. A base station, comprising:
a receiver that receives radio signals from a user equipment;
a transmitter that transmits signals to the user equipment; and
a processor that:
 uses the receiver to acquire capability information from the user equipment, wherein the capability information includes:
  one or more information elements of small gap measurement applicability information indicative of applicability of small gap measurement in respective to-be-measured carriers,
  a small gap period for causing communication with the base station to be interrupted in the small gap measurement, and
  an inter-frequency measurement period; and
 causes the transmitter to transmit a small gap measurement applied inter-frequency measurement indication indicative of the small gap period and the inter-frequency measurement period to the user equipment based on the capability information acquired from the user equipment,
 wherein:
  the small gap period and the inter-frequency measurement period correspond to a measurement gap pattern ID indicated in the inter-frequency measurement indication, the small gap period causing the inter-frequency measurement period to be sandwiched,
  the measurement gap pattern ID is predefined based on the small gap period and the inter-frequency gap period, and
  the small gap measurement applied inter-frequency measurement is an inter-frequency measurement to which a small gap measurement is applied.

6. The base station as claimed in claim 5, wherein the processor determines whether the small gap measurement is applicable in the respective to-be-measured carriers based on the acquired small gap measurement applicability information and if the small gap measurement is applicable in all the to-be-measured carriers, indicates an indication to cause the small gap measurement to be applied as well as an inter-frequency measurement indication indicative of the small gap period and the inter-frequency measurement period to the user equipment.

7. The base station as claimed in claim 5, wherein the processor acquires, through the receiver, the small gap period and the inter-frequency measurement period corresponding to a measurement use type as the capability information from the user equipment, and the processor causes the transmitter to transmit an inter-frequency measurement indication indicative of the small gap period and the inter-frequency measurement period corresponding to the measurement use type to the user equipment based on the small gap period and the inter-frequency measurement period corresponding to the measurement use type acquired from the user equipment.

8. A method for a base station to indicate inter-frequency measurement to user equipment, comprising:
acquiring capability information from the user equipment, wherein the capability information includes one or more information elements of small gap measurement applicability information indicative of applicability of small gap measurement in respective to-be-measured carriers, a small gap period for causing communication with the base station to be interrupted in the small gap measurement and an inter-frequency measurement period;
determining whether the small gap measurement is applicable in the respective to-be-measured carriers based on the capability information acquired from the user equipment; and
upon determining that the small gap measurement is applicable in all the to-be-measured carriers, indicating an inter-frequency measurement indication indicative of an indication to apply the small gap measurement to the user equipment, the indication indicating the small gap period and the inter-frequency measurement period,
wherein:
 the small gap period and the inter-frequency measurement period correspond to a measurement gap pattern ID indicated in the inter-frequency measurement indication, the small gap period causing the inter-frequency measurement period to be sandwiched, the measurement gap pattern ID is predefined based on the small gap period and the inter-frequency gap period, and the small gap measurement applied inter-frequency measurement is an inter-frequency measurement to which a small gap measurement is applied.

9. The user equipment as claimed in claim 2, wherein the processor further causes the transmitter to transmit the inter-frequency measurement period as the capability information to the base station.

10. The user equipment as claimed in claim 2, wherein the processor further causes the transmitter to transmit the small gap period and the inter-frequency measurement period corresponding to a measurement use type as the capability information to the base station.

11. The user equipment as claimed in claim 3, wherein the processor further causes the transmitter to transmit the small gap period and the inter-frequency measurement period corresponding to a measurement use type as the capability information to the base station.

12. The base station as claimed in claim 6, wherein processor acquires, through the receiver, the small gap period and the inter-frequency measurement period corresponding to a measurement use type as the capability information from the user equipment, and the processor causes the transmitter to transmit an inter-frequency measurement indication indicative of the small gap period and the inter-frequency measurement period corresponding to the measurement use type to the user equipment based on the small gap period and the inter-frequency measurement period corresponding to the measurement use type acquired from the user equipment.

* * * * *